United States Patent Office 3,219,725
Patented Nov. 23, 1965

3,219,725
SEGMENTED OXYMETHYLENE BLOCK COPYLMERS
Earl Vance Kirkland, Millington, N.J., and William John Roberts, Berwyn, Pa., assignors to Celanese Corporation of America, New York, N.Y., a corporation of Delaware
No Drawing. Filed May 4, 1962, Ser. No. 192,320
7 Claims. (Cl. 260—823)

This invention relates to block copolymers and particularly to block copolymers having at least one segment of successively recurring oxymethylene groups.

Moldable oxymethylene polymers having successively recurring oxymethylene groups are of commercial interest because of their attractive physical and chemical properties. In some cases it may be desirable to modify these properties for particular applications.

In accordance with one aspect of this invention a method has been discovered for achieving molecular modification of oxymethylene polymers to modify their properties, particularly with respect to strength characteristics, solvency, crystallinity, and thermal stability.

Specifically, the invention relates to the method of preparing a segmented oxymethylene block copolymer which comprises polymerizing, in the presence of an anionic initiator, a monomer capable of such polymerization until polymer molecules having at least one anionic end and successive units derived from said monomer are produced, thereafter polymerizing at least one other monomer capable of polymerization by anionic propagation onto said anionic ends, one of said monomers being a member of the group consisting of formaldehyde and acetaldehyde.

In accordance with other aspects of this invention block copolymers are produced which could not be produced by prior polymerization methods. For example, there may be produced a segmented block copolymer having a segment of successively recurring oxymethylene units bonded directly to a segment of successively recurring moieties of a vinyl monomer capable of polymerization by anionic initiation. The segmented block copolymers of this invention are not to be confused with random copolymers made by some more common methods.

Polymer molecules having at least one anionic end and which are capable of adding an additional unit of the same monomer or of another monomer but substantially incapable of combining with each other have been called "living" polymers. Such molecules are non-self-terminating. In the absence of impurities such "living" polymer molecules are relatively stable since the active anionic ends have nothing to combine with which might neutralize their activity.

In accordance with the method of this invention an anionic polymerization is initiated in a system wherein the growing polymer product is itself anionic at at least one end and capable of taking on additional monomer. Whether the growing polymer is anionic at one end or at both ends depends upon the nature of the anionic initiator.

Anionic initiators which produce growing polymers which are anionic at only one end include the metal organic compounds whose organic portions are monovalent hydrocarbon radicals, such as alkyl, aryl and cycloalkyl radicals. Specific initiators of this class include butyl lithium, butyl sodium, phenyl lithium, diethyl zinc, diethyl cadmium, tributyl boron, tetraethyl tin and triethyl chromium.

In polymerization with butyl lithium, for example, a monomer molecule, such as a styrene molecule, becomes attached to the anionic butyl radical by its outer vinyl carbon atom to produce an addition product having an anionic charge on the other vinyl carbon atom. Additional styrene molecules attach themselves successively until a long chain polystyrene molecule is produced having a butyl group at one end and an anionic charge on the other.

If the reactable styrene monomer is depleted and the reaction mixture remains uncontaminated, the anionic polystyrene molecules do not react with each other but remain capable of reaction with additional styrene or with another monomer capable of polymerization by anionic propagation.

Since each butyl lithium molecule initiates one anionic polymer chain, the number of polymer chains is determined by the amount of initiator present, assuming no reactive reagents other than monomers are introduced. The length of the polymer chain is determined by the amount of monomer reacted relative to the amount of iniator used. Thus, when reactive impurities are completely excluded, the D.P. (degree of polymerization in moles of monomer per molecule of polymer) is equal to the moles of monomers reacted divided by the moles of initiator employed.

If formaldehyde is added to the polymerization system upon depletion of the reactable styrene, formaldehyde molecules add on to the chain successively to form chains having an anionic charge on a terminal oxygen atom. These chains will continue to build up until the reactable formaldehyde is depleted. The length of the oxymethylene segments depends upon the amount of formaldehyde and the number of anionically active polystyrene molecules. Usually polymer products containing from about 3 wt. percent to about 95 wt. percent of oxymethylene groups are made.

In the propagation of a "living" polymer by a particular monomer such as styrene or formaldehyde, the reaction continues until a state resembling equilibrium is reached and additional monomer, while it may be present in the reaction zone is no longer added to the anionic polymer chain. This state is described herein as the depletion of the "reactable" monomer.

If it is desired to have the oxymethylene segment as a terminal segment of the block copolymer, the anionic charge may be neutralized by the introduction of a small amount of alcohol or water into the polymerization zone.

In many cases it will be found to be desirable to add an additional segment to the polymer. In such cases a third monomer, such as acrylonitrile is added to the system after the depletion of the formaldehyde. The length of the acrylonitrile segment is similarly dependent on the amount of acrylonitrile and the number of anionic polymer chains.

The polymer segments beyond the oxymethylene segment may be used to stabilize the polymer ends against degradation by decomposition of successive terminal oxymethylene units. In such cases the outer polymer segments can be quite short, and can theoretically comprise only a single unit.

The polymer segments should be of sufficient length to be chemically significant. Inner segments are generally at least ten monomer units in length but outer segments can comprise only a single unit.

The block polymerization reaction is often carried out at reduced pressure, since evacuation of the system aids removal of reactive reagents that interfere with anionic propagation, such as oxygen, water, alcohols, etc. However, higher pressures may be used if such reactive reagents are excluded.

The polymerization described in this invention generally is homogeneous since it is carried out in solution, i.e., monomers and initiators are dissolved. The solvent generally is chosen for the particular system. For example, a non-polar solvent such as heptane may be used, but since terminated styrene polymer and styrene block anions are only slightly soluble in heptane, a more preferable non-polar solvent for polymers containing styrene blocks is toluene which dissolves appreciable polymer and anion. A polar solvent, such as tetrahydrofuran is often used because it is a good solvent for many polymers.

Usually solvent is used in sufficient amount to provide at least 50 wt. percent of solvent in the final product and preferably at least 90 wt. percent.

The polymerization temperature is preferably not higher than room temperature and may be as low as the freezing point of the solvent. The temperature used for the polymerization is governed by the monomer reacting. Styrene adds readily to anion at room temperature but α-methyl styrene is preferably polymerized at lower temperatures, of the order of −40° C. Formaldehyde is preferably polymerized at temperatures not higher than about 0° C. and acrylonitrile at temperatures not higher than about −50° C.

As described above, each successive monomer is added upon depletion of the previous reactable monomer. As a practical matter it may be difficult to determine when this has happened. Ordinarily the next monomer may be introduced after a period which experience teaches to be sufficient for the polymerization of a particular monomer under particular conditions.

In the event that a monomer is introduced prior to the depletion of the prior monomer, the new growth on the chain will comprise a segment of either the prior monomer or the new monomer, but not a mixed segment of both. In the event that the new monomer is more strongly susceptible to anionic polymerization under the existing conditions, it will immediately begin adding on to the growing chains instead of the prior monomer. If, on the other hand, the prior monomer is more strongly susceptible it will continue to add on to the growing molecules until its reactable portion is depleted, whereupon the new monomer will begin to add on.

Among vinyl monomers, a convenient measure of susceptibility to anionic propagation in accordance with this invention is the "e value" which is correlated with the electron-donating or electron-accepting character of the substituent or substituents at the vinyl double bond. A monomer with a more positive (i.e.—less negative) "e value" will add readily to a chain of units of a monomer having a less positive "e value."

Typical "e values" and the method of determining "e values" are disclosed in "High Polymers," vol. VIII, "Copolymerization" by Alfrey, Bohner & Mark, published 1952 by Interscience Publishers and particularly at chapter IV, pages 79 to 104 and in the table on page 91.

In some cases it may be desirable to terminate the addition of a particular monomer at a desired chain length by the addition of a more reactive monomer rather than by depletion.

In an alternative embodiment of this invention the initial monomer may be polymerized in the presence of another class of anionic initiators which produce growing molecular chains having both ends anionic. This class of anionic initiator includes the addition compounds of alkali metals with aromatic hydrocarbons containing at least two aromatic rings. The rings may be joined as in biphenyl, conjugated as in 1,4 diphenylbutadiene, or fused as in naphthalene or anthracene. Typical addition compounds of this type include sodium, lithium and potassium addition compounds with naphthalene, biphenyl, phenanthrene, chrysene, pyrene, anthracene, fluoranthene, perylene and tetracene.

Other materials capable of converting a monomer such as an aldehyde or a vinyl compound into an anionic initiator may also be used according to this invention. The alkali metals are specific examples of materials that react with vinyl compounds to form an anion to which successive monomers may be added. When alkali metals are used, the initiator formed is a di-anion, i.e., there is an anionic charge on both ends of the growing chain.

A class of compounds that have been called anionic telomers have also been used as di-anionic initiators. This includes compounds such as that formed by reaction of α-methyl styrene and sodium in a polar solvent such as tetrahydrofuran and in the absence of reactive reagents, a solution of this organometal compound may be used to start propagation of other monomers which occurs via a di-anion. The α-methyl styrene, in this case, is actually the central block of the polymers formed, but without adding additional aromatic monomer, the central block of α-methyl styrene may be insignificant with respect to the properties of the polymer product.

When di-anionic initiators are used the initial monomer forms a single central segment of the polymer while successive monomers form pairs of outer segments until the last monomer which forms the two outermost segments.

The polymers formed by mono-anionic propagation may be represented by A–B–X; where A is a block formed from several molecules of the first monomer added, B is a block formed from several molecules of the next added monomers, and X may be a succeeding block or blocks. The polymers formed by di-anionic propagation may be represented by X–B–A–B–X, where A is a block formed from several molecules of the first monomer added, etc. In either the system with the single growing end or the system with both growing ends the formaldehyde may be the initial monomer or any subsequent monomer, including the last. Since oxymethylene polymers are subject to successive terminal decomposition of oxymethylene groups when heated, it is preferred that formaldehyde should not be the last monomer used unless some other type of end-capping, as by esterification or etherification, is contemplated.

Among the monomers capable of polymerization by anionic initiation which may be used in accordance with this invention are ethylenically unsaturated monomers (vinyl and vinylidene monomers), olefin oxides, higher aldehydes, alkyl and aryl isocyanates and isothiocyanates.

The vinyl monomers are those which contain some functionality in addition to the vinyl double bond. The vinyl monomers may be a hydrocarbon which contains an additional double bond such as isoprene or butadiene, or contains an aromatic ring, such as styrene or α-methyl styrene. Alternately, the vinyl or vinylidene monomer may contain a functional substituent other than a substituent having an unblocked carbonyl oxygen atom. Suitable vinyl monomers include styrene, α-methyl styrene, isoprene, butadiene, acrylonitile, methyl methacrylate, ethyl methacrylate and t-butyl acrylate. Suitable olefin oxides include ethylene oxide, propylene oxide and styrene oxide. Suitable higher aldehydes include propionaldehyde and butyraldehyde.

The monomers should be purified and free of moisture and impurities. Polymerization inhibitors, if present in the monomers should preferably be removed.

The polymer is readily recovered from the reaction solution by pouring into a precipitating liquid, such as methanol or water and then separating the precipitated product by filtration and drying.

The polymers formed in accordance with this invention are generally wholly or partly crystalline when made with formaldehyde wtih individual blocks differing in crystallinity from adjacent blocks. With other aldehydes the block polymers may be amorphous, partly or wholly crystalline. The oxymethylene blocks are crystalline even when prepared in a polar solvent such as tetrahydrofuran despite the fact that polymers of other monomers formed in such solvents are often amorphous. Other blocks in the polymer when it is produced from polar solvents are often amorphous. The block copolymer formed of formaldehyde and styrene in a polar solvent has both crystalline and amorphous properties. It may have both a softening point and a melting point if the amorphous and crystalline blocks are each of appreciable relative size. In addition, it may exhibit birefringence if the oxymethylene blocks amount to more than 5 wt. percent of the total polymer.

For optimum thermal stability, as stated above, it is desirable that the oxymethylene segments shall not be the outermost segments. The stability of the segmented block copolymers may be improved by the incorporation of stabilizers known to be effective in the thermal stabilization of moldable oxymethylene polymers. One suitable stabilizer system is a combination of an anti-oxidant ingredient such as phenolic anti-oxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from 1 to 4 carbon atoms. The preferred alkylene bisphenols are 2,2'-methylene bis-(4-methyl-6-tertiary butyl phenol) and 4,4'-butylidene bis-(6 tertiary butyl-3 methyl phenol). Suitable phenolic stabilizers other than alkylene bis-phenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable anti-oxidants and proportions are disclosed in U.S. Patent No. 3,152,101, issued to Dolce on October 6, 1964, U.S. Patent No. 3,144,431, issued to Dolce, Berardinelli and Hudgin on August 11, 1964, application Serial No. 838,-427, filed by Berardinelli on September 8, 1959, now abandoned, application Serial No. 838,832, filed by Dolce and Hudgin on September 9, 1959, application Serial No. 841,690, filed by Kray and Dolce on September 23, 1959, now abandoned, application Serial No. 851,560 filed by Berardinelli, Kray and Dolce on November 9, 1959, now abandoned, U.S. Patent No. 3,133,896, issued to Dolce and Berardinelli on May 19, 1964 and U.S. Patent No. 3,156,669, issued to Kray and Dolce on November 10, 1964. The disclosures of the above-mentioned applications are incorporated herein by reference.

*Example I*

Styrene (17 ml.) was distilled into a solution of sodium diphenyl (0.3 milli-mole) in about 300 cc. tetrahydrofuran at −60° C. The solution was stirred for about 20 minutes to complete the polymerization and then about 10 grams formaldehyde was condensed into the solution at about −30° C. and stirred for about 30 minutes. The final solution contained about 8 wt. percent of tri-segmented polymer. The product obtained in nearly quantitative yield, analyzed to contain about 65% styrene and about 35% polyoxymethylene, by weight. The polymer was birefringent on a polarizing microscope. The birefringence disappeared at 155–164° C. (M.P.). It was soluble in chlorobenzene and had an inherent viscosity of 0.3. The polymer decomposed at 160 C. with the evolution of formaldehyde at a rate greater than 2.0 wt. percent/min. The latter value was measured while the polymer still contained appreciable polyoxymethylene units in the tri-segmented polymer.

It is to be noted that the segmented block copolymer was soluble in chlorobenzene while oxymethylene homopolymer is not.

EXAMPLE II

After reacting the same monomers used in Example I (in the same solvent and with the same initiator), acrylonitrile was distilled in into the reaction mixture at −70° C. on the vacuum manifold. The product was stirred for about 2 hours, separated and dried as in Example I. From an elemental analysis for C, H, and N, the penta-segmented polymer was calculated to contain about 76% styrene, 23% formaldehyde and 0.2% acrylonitrile, by weight. X-ray studies indicated the product was partially crystalline. The polymer softened at 125–140° C., and the inherent viscosity in chlorobenzene was 0.7. The polymer is much more stable thermally than that of Example I. Specifically, the decomposition rate at 160° C. in air measured while the copolymer still contained appreciable oxymethylene units, was about 0.3 wt. percent/min.

EXAMPLE III

To a solution of about 4 millimoles of butyl lithium in about 250 ml. of tetrahydrofuran in a reaction flask connected to the vacuum manifold was added alpha-methyl styrene (11 ml.) at −70° C. After allowing a period of about 30 minutes for completion of polymerization, about 8–10 grams of formaldehyde was added to the solution, held at about −30° C. The deep red color of the alpha-methyl styrene polymeric anion disappeared immediately after adding the formaldehyde leaving a clear, colorless solution which was more viscous than solvent alone. The solution viscosity increased with the addition of formaldehyde over a period of about 2 hours and the polymer concentration did not exceed 10% by weight. The dried product, obtained in nearly quantitative yield, was birefringent on a polarizing microscope. The polymer dissolved in ethylene dichloride in which the inherent viscosity was 0.1. From the elemental analysis (i.e., C and H), the proportion of monomers in this bi-segmented block polymer was about 60% alpha-methyl styrene and 40% formaldehyde. The polymer thermally decomposed rapidly, evolving formaldehyde, likely because of the terminal oxymethylene groups. At 230° C., while appreciable oxmythylene groups remained in the polymer, the decomposition rate exceeded 5 wt. percent/min.

EXAMPLE IV

A polymer was made similar to the method of Example III except that about 9 ml. propylene oxide was added to the reaction mixture after reaction of the formaldehyde. As calculated from elemental analysis, the tri-segmented polymer obtained contained 72% α-methyl styrene, 21% formaldehyde and 6% propylene oxide, by weight and was appreciably more thermally stable than the product of Example III. Specifically, at 230° C. in air, while appreciable oxymethylene units remained in the polymer, the rate of decomposition was about 1.9 percent/min.

EXAMPLE V

The polymer of Example IV was further stabilized by the incorporation of 0.5% 2,2'-bis-(4-methyl-6-t-butyl phenol) and 0.1% of cyanoguanidine. The proper weights of inhibitors, dissolved in methanol, were added to the polymer (insoluble in methanol) and stirred. The solvent was removed by evaporation. The inhibited polymer decomposed slowly at 230° C., i.e., at about 0.5 wt. percent/min., while appreciable oxymethylene units remained in the polymer.

EXAMPLES VI TO VIII

The following examples were run similarly to the preceding examples, using about 0.4 millimole of butyl lithium in about 300 ml. of tetrahydrofuran as initiator in a reaction flask connected to a vacuum manifold. Composite yields are given below for each example in weight percent based on total weight of all monomers added. However, it should be understood that the yield for an individual monomer may vary substantially from the composite yield since the reactivities of the individual monomers are different.

*Table I.—Segmented block polymers*

| Example | Polymer¹ type | Weight percent proportions | Yield | M.P., °C.² |
|---|---|---|---|---|
| VI | B-C-F | 83B-16.9C-0.1F | 64 | 160-169 |
| VII | B-C-G | 49B | 51 | 158-163 |
| VIII | B-C-H | 92B-4C-4H | 69 | 165-170 |

¹ The butyl group from butyl lithium is not shown.
B is a block of α-methyl styrene monomer.
C is a block of formaldehyde monomer.
F is a block of acrylonitrile monomer.
G is a block of t-butyl acrylate monomer.
H is a block of propylene oxide monomer.
² The M.P. shown here were measured as the loss of birefringence on a polarizing microscope.

EXAMPLES IX TO XV

Dianionic propagation to form block polymers was carried out similarly to the example given above. The telemeric anion formed by reaction of α-methyl styrene with sodium in tetrahydrofuran was used to start propagation in the Examples IX to XI and XIII to XV. With this material, the telomeric anion is incorporated in the polymer. Initiators such as sodium naphthalene may be used to obtain the same polymers, but the naphthalene portion of the initiator is not chemically bound in the polymer. With either initiator or telomeric anion, about 0.5 millimole of the anionic material was added to about 300 ml. of pure tetrahydrofuran in a reaction flask, to which the monomers were subsequently and successively added. Again, the yields are based on total wt. of monomers added.

*Table II.—Segmented block polymers*

| Example | Polymer¹ Type | Proportion Wt., Percent | Yield | M.P., °C.² | I.V.³ |
|---|---|---|---|---|---|
| IX | H-C-B-C-H | 0.3B-90C-9H | 12 | | 0.5 (XIV) |
| X | F-C-B-C-F | 97.2B-2.4C-0.4C | 65 | ⁴210 | 0.6 (XIV) |
| XI | Q-C-B-C-Q | 84-B-15C-1Q | 100 | ⁴210 | 0.3 (XIV) |
| XII | F-C-B-C-F | 50.4B-49.3C-0.3F | | 170-175 | 1.11 (XIV) |
| XIII | F-C-N-C-F | 66.3N-32.6C-1.1F | 48 | 170-175 | 0.6 (III) |
| XIV | F-C-B-C-F | 3B-96.2C-0.9F | 38 | 168-171 | 0.12 (XIX) |
| XV | F-C-B-C-F | 78.1B-20.9C-1F | 100 | 169-172 | 0.4 (XIX) |

¹ B is a block of α-methylstyrene monomer.
C is a block of formaldehyde monomer.
N is a block of isoprene monomer.
H is a block of propylene oxide monomer.
F is a block of acrylonitrile monomer.
Q is an acetate end group.
² M.P. given is temperature of disappearance of birefringence on polarizing microscope.
³ III is benzene solvent.
XIV is solvent of 98% p-chlorophenol and 2% alpha-pinene.
XIX is solvent of 50/50 m/cresol/p-chlorophenol.
⁴ Values given are softening temperature—not M.P.

EXAMPLE XVI

In this example acetaldehyde was polymerized in the form of a block polymer and the initiator used was the compound formed by reaction of sodium with diphenyl in tetrahydrofuran solvent and in the absence of reagents which will react with the organo-metal compound. With this initiator, propagation is by dianions and the organic moiety is not included in the polymer. About 0.5 millimole of initiator was added to about 300 ml. tetrahydrofuran and α-methyl styrene distilled into the mix at −70° C., followed by acetaldehyde and acrylonitrile all added to the mix at −70° C. The reaction mixture was stirred at −70° C. for about 1 hour after each addition. An overall polymer yield, based on total amount of monomers added, of 57% was obtained, which was a result of polymerizing most of the α-methyl styrene. About half of the added acetaldehyde and only a small amount of the acrylonitrile added reacted. The polymer had an inherent viscosity of 1.64 (dioxane) formed a clear transparent film, and thermally decomposed at 3.1 wt. percent min. at 110° C. The polymer is appreciably more thermally stable than the uncapped polymer (i.e. no acrylonitrile). The capped polymer has a softening point of about 210° C., but does not appear to be crystalline. During the melting or when burned, the polymer evolves a noticeable amount of acetaldehyde and in general, appears to be somewhat less thermally stable than the comparative polymers of formaldehyde.

It is understood that the foregoing detailed description is given merely by way of illustration and that many variations may be made therein without departing from the spirit of our invention.

Having described our invention what we desire to secure by Letters Patent is:

1. A method of preparing segmented block copolymers comprising
    (1) polymerizing a first anionically polymerizable monomer selected from the group consisting of formaldehyde and acetaldehyde in a fluid reaction zone and in the presence of a catalytic amount of an anionic polymerization catalyst selected from the group consisting of
        (a) alkyl, aryl and cycloalkyl metalloorganic hydrocarbons wherein the metal is selected from the group consisting of lithium, sodium, zinc, cadmium, boron, tin and chromium, and
        (b) addition compounds of alkali metals with compounds selected from the group consisting of aromatic hydrocarbons having at least two aromatic rings and vinyl compounds,
    to form a first polymeric segment consisting of recurring units derived from said monomer, and having at least one propagating terminal anionic radical; and
    (2) thereafter charging to said reaction zone a second, different anionically polymerizable monomer selected from the group consisting of vinylidene hydrocarbons, olefin oxides and aldehydes having more than 2 carbon atoms and polymerizing said monomer onto said propagating terminal anionic radical in the presence of said catalyst,
    to form a segmented block copolymer comprising first and second polymeric segments consisting, respectively, of recurring units derived from said first and second monomers, and having at least one propagating terminal anionic radical.

2. The method of claim 1, further comprising the step of charging to said reaction zone a third, different anionically polymerizable monomer selected from the group consisting of vinylidene hydrocarbons, olefin oxides, and aldehydes having more than two carbon atoms and polymerizing said monomer onto said propagating terminal anionic radical of said segmented block copolymer, said monomer being provided in such proportion to form from about 0.1 to about 9.0 weight percent of the resulting segmented block copolymer.

3. The method of claim 1, wherein said polymeric segment of said monomer selected from the group consisting of formaldehyde and acetaldehyde consists of at least 10 of said recurring units which comprise from about 3 to about 95 weight percent of said copolymer.

4. The method of claim 1, wherein said reaction zone comprises an inert organic solvent maintained at a temperature between the freezing point of said solvent and about 20° C.

5. The method of claim 2, wherein said third monomer is acrylonitrile.

6. The method of claim 2, wherein said third monomer is propylene oxide.

7. A method of preparing segmented block copolymers comprising
(1) polymerizing a monomer selected from the group consisting of formaldehyde and acetaldehyde in a reaction zone comprising an inert organic solvent at a temperature between the freezing point of the solvent and 20° C. in the presence of a catalytic amount of an addition compound of an alkali metal with an aromatic hydrocarbon having at least two aromatic rings, to form a polymeric segment consisting solely of recurring units of the structure $$-\underset{R}{\overset{}{C}}HO-$$

wherein R is selected from the group consisting of hydrogen and methyl, said polymeric segment having a propagating anionic radical at each end thereof; and (2) thereafter charging to said reaction zone an anionically polymerizable monomer selected from the group consisting of vinylidene hydrocarbons, olefin oxides, and aldehydes having more than two carbon atoms, and polymerizing said monomer onto said propagating terminal anionic radicals at a temperature between the freezing point of the solvent and 20° C., in the presence of said anionic polymerization catalyst, to form a segmented block copolymer having a polymeric segment consisting solely of recurring units having the structure $$-\underset{R}{\overset{}{C}}HO-$$

wherein R is selected from the group consisting of hydrogen and methyl, directly bonded at each end thereof to a polymeric segment consisting solely of a recurring unit derived from said anionically polymerizable monomer.

References Cited by the Examiner

UNITED STATES PATENTS

| 2,273,461 | 4/1945 | Hanford | 260—73 |
| 2,844,561 | 7/1958 | Bechtold et al. | 260—874 |
| 3,029,216 | 4/1962 | Bailey et al. | 260—823 |
| 3,050,511 | 8/1962 | Szwarc | 260—93.5 |

FOREIGN PATENTS

| 582,945 | 9/1959 | Canada. |
| 611,440 | 12/1961 | Belgium. |
| 1,272,971 | 8/1961 | France. |

OTHER REFERENCES

Kern et al.: Chemical Abstracts, vol. 57, page 12734(a).

Rosenkranz et al.: Chemical Abstracts, vol. 57, page 8751(h).

Fujii: Chemical Abstracts, vol. 59, page 2966(c).

LEON J. BERCOVITZ, *Primary Examiner.*

DONALD E. CZAJA, *Examiner.*